United States Patent

[11] 3,625,562

[72] Inventors Bela Barenyi
Stuttgart-Vaihingen;
Karl Wilfert, Gerlingen-Waldstadt, both of Germany
[21] Appl. No. 801,038
[22] Filed Feb. 20, 1969
[45] Patented Dec. 7, 1971
[73] Assignee Daimler-Benz Aktiengesellschaft
Stuttgart-Unterturkheim, Germany
[32] Priorities Feb. 23, 1968
[33] Germany
[31] P 16 80 020.7;
Oct. 3, 1968, Germany, No. P 18 00 778.8

[54] CENTER SUPPORT COLUMN FOR MOTOR VEHICLES ROOFS
38 Claims, 11 Drawing Figs.
[52] U.S. Cl. ............................................ 296/28 R
[51] Int. Cl. ............................................. B62d 27/02
[50] Field of Search........................................ 296/28, 37, 146; 280/150 F; 254/86, 86 H

[56] References Cited
UNITED STATES PATENTS

| | | | |
|---|---|---|---|
| 2,639,938 | 5/1953 | Pickard | 296/28 |
| 2,716,040 | 8/1955 | Barenyi | 254/86 |
| 2,915,334 | 12/1959 | Barenyi | 280/150 |
| 3,081,126 | 3/1963 | Theberge | 296/37 |
| 3,348,881 | 10/1967 | Weman | 280/150 |
| 3,411,602 | 11/1968 | Royce | 280/150 |

FOREIGN PATENTS

| | | | |
|---|---|---|---|
| 513,441 | 4/1939 | Great Britain | 296/28 |

*Primary Examiner*—Benjamin Hersh
*Assistant Examiner*—Robert R. Song
*Attorney*—Craig, Antonelli and Hill ABSTRACT: A center support column for motor vehicle roofs in which a hollow cross-sectional profile is provided within the connecting areas of the roof bearers and longitudinal bearers which is constructed relatively wide in the longitudinal direction of the vehicle; the cross-sectional profile forms one or several spaces, suitable for storing accessories whereby the spaces are accessible from within and/or without the vehicle.

PATENTED DEC 7 1971 3,625,562

INVENTORS
BELA BARENYI
KARL WILFERT

BY Craig, Antonelli, Stewart & Hill

ATTORNEYS

INVENTORS
BELA BARENYI
KARL WILFERT

ATTORNEYS

CENTER SUPPORT COLUMN FOR MOTOR VEHICLES ROOFS

The present invention relates to a center support column for motor vehicle roofs.

Known center support columns in motor vehicle bodies fulfill the task of contributing to the enhancement of the bearing capacity of the motor vehicle roof and therewith to the reinforcement of the passenger space, only inadequately. This can be generally traced back to the fact that the known center support columns are angularly connected both with the roof beams or bearers as well as also with the lower, longitudinal bearers of the body so that, for example, during rolling over of a vehicle after an accident, stress peaks occur at the connecting places between the center support columns, on the one hand, and the roof beams and/or longitudinal bearers, on the other, which lead to a bending or breaking off of the bearers. Particularly strong center support columns constructed relatively wide are known in the prior art which avoid this disadvantage. However, these columns of the prior art entail the significant disadvantage that in part they considerably restrict the useful space of the vehicle. Especially smaller types of vehicles cannot be equipped with such strong center support columns.

The aim of the present invention resides in avoiding the disadvantages of the known types of construction of center support columns for motor vehicle roofs and in creating a construction which, in addition to a great bearing capacity, also creates the possibility for gaining useful space.

The present invention essentially consists in that at least within the area of connection of the roof beams and of the lower longitudinal bearers, a hollow cross-sectional profile that is constructed relatively wide in the longitudinal direction of the vehicle is provided, and that one or several hollow space sections are arranged on the inside of the cross-sectional profile suitable for the accommodation of accessory parts which spaces are accessible from the interior of the vehicle and/or from the outside. The present invention thereby utilizes the large bearing capacity of hollow profiles or sectional members, however, simultaneously opening up the possibility to arrange in the vehicle, for example, loud speakers, warning triangles, first-aid kits, umbrellas, or the like, without requiring therefor a special space, for example, in the luggage space.

A particularly advantageous type of construction results if the cross-sectional profile of the center support column is so constructed at the connecting places that the center column is connected with rounded-off corners at the roof beams and/or at the longitudinal bearers of the body. Stress peaks can be avoided by means of the rounded-off corners so that the rigidity of the passenger space can be considerably increased. An advantageous further construction and development of the present invention by a further significant reinforcement of the passenger space is achieved if at least the hollow cross-sectional profile disposed within the area of the roof beams adjoins a specially constructed and dimensioned crossbearer. The passenger space can be considerably reinforced in its center by this construction, especially if in addition to a roof crossbearer, also a floor crossbearer is provided so that a stable center support ring results.

A particularly advantageous type of construction of the present invention results if the crossbearer is constructed as rollover bar. A simple construction is realized if the crossbearer is formed by a flanged member or truss and by the roof sheet metal plate itself. The crossbearer may be arranged thereby detachably inside or below the roof beams or girders. It is also possible that the cross bearer is constructed at its ends directly as the upper hollow cross-sectional profile, whence a simple manufacture can be achieved. The ends of the crossbearer, however, can also be connected by way of readily detachable means with the lower hollow cross-sectional profile of the center support column. It has proved thereby as particularly appropriate if the cross-sectional profile is enlarged from the narrowest cross section disposed within the area of the side windows toward the top and/or toward the bottom.

It has been demonstrated as appropriate if a hollow space open toward the inside is provided within the upper area of the center column, which is provided with an installation for the fastening and accommodation of safety belts, preferably with a belt roll for winding up the safety belts. With this type of construction, the frequently disturbing handing-around of nonused safety belts on the inside of the passenger space can be avoided. Simultaneously, a stable and strong connection of the safety belt is assured without the danger that during an impact the connecting places may cause injuries to the passengers by the projecting parts. With this type of construction it is further favorable if the inner side of the center column is provided with elastic padding materials which are provided only with the necessary openings for the pulling out of the safety belts.

Another favorable type of construction results if within the lower area, a hollow space open toward the bottom is provided for the accommodation of an automatically extensible and retractable vehicle lifting jack, because in this manner, in case of flat tires or the like, the jack does not have to be removed first from the luggage space and does not need to have to be inserted into the connecting places laterally provided therefor. Within the lower area of the center column, however, a hollow space may be provided suitable for the accommodation of first-aid kits, triangular warning shields, or fire extinguishers or the like.

Finally, a particularly favorable type of construction results if the center column—as viewed from the side—has the shape of two trapezoids which abut against one another with their narrow side. Simultaneously with this type of construction, if for example, the upper trapezoid is smaller than the lower trapezoid, a maximum visibility for the passengers toward the outside is achieved. In connection therewith, for example, for a roadster-type vehicle with removable roof, the lower area may be detachably connected at the upper area of the center post in a separating plane.

Accordingly, it is an object of the present invention to provide a center support column for the motor vehicle roofs which avoids by simple means the aforementioned shortcomings and drawbacks encountered in the prior art.

Another object of the present invention resides in a center support column for motor vehicle roofs which contributes considerably to the rigidity and safety of the passenger space, yet can be used also in small types of vehicles without impairment of the useful space.

A further object of the present invention resides in a center support column for motor vehicle roofs which not only does not reduce the useful space of the vehicle but can be manufactured and installed without great expenditures.

Still a further object of the present invention resides in a center support column for motor vehicle roofs which permits a further reinforcement of the passenger space.

Another object of the present invention resides in center support columns for motor vehicles which at the same time permit the accommodation and/or storing of accessories without reducing the useful space of the vehicle.

These and further objects, features and advantages of the present invention will become more obvious from the following description when taken in connection with the accompanying drawings, which shows for the purposes of illustration only, several embodiments in accordance with the present invention, and wherein.

Figure 1:
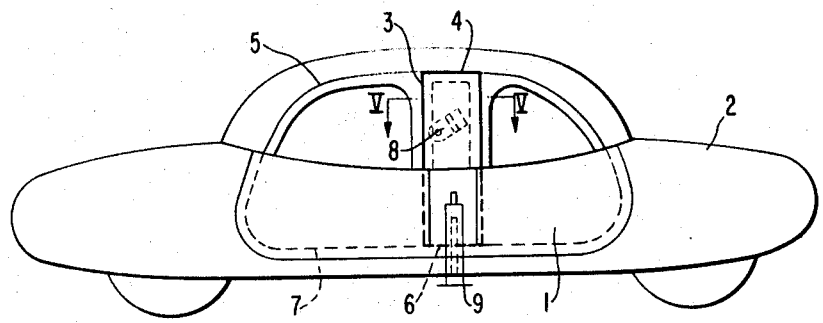
FIG. 1 is a schematic side elevational view of a motor vehicle which is equipped with a center support column in accordance with the present invention that is provided in its upper, hollow space section with safety belt anchoring means and in its lower section with a built-in vehicle lifting jack.
Figure 5:
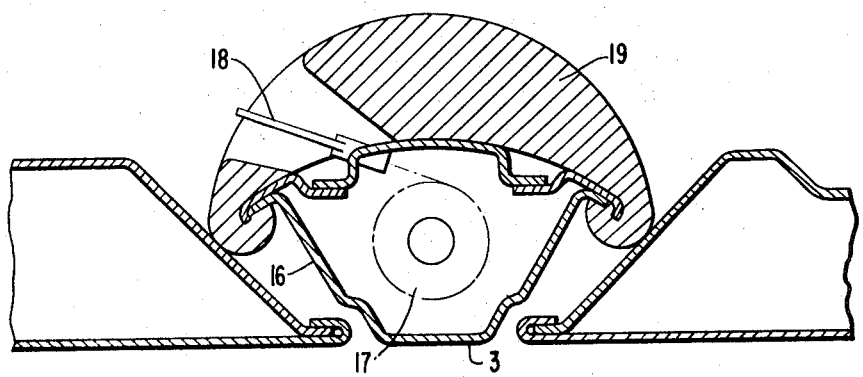
FIG. 5 is a horizontal cross-sectional view, on an enlarged scale, through the embodiment of FIG. 1, taken along line V—V thereof.

Referring now to the drawing wherein like reference numerals are used throughout the various views to designate like parts, and more particularly to FIG. 1, the passenger space 1 of a motor vehicle 2 illustrated in this figure is reinforced by a center support column 3 which, as can be seen in particular also from FIG. 5, is constructed as hollow profile or sectional member and is connected at its upper side 4 to the roof longitudinal beams or bearers 5 and at its lower side 6 to the longitudinal bearers 7 of the vehicle body. Within the upper section of the hollow central column 3 is provided a safety-belt anchoring means 8; a lifting jack 9 for the vehicle is securely built into the lower section thereof which, for example, is adapted to be extended downwardly or retracted upwardly in a conventional manner by actuation from the instrument panel without necessitating a complicated insertion in connecting places provided therefor.

Figure 2:
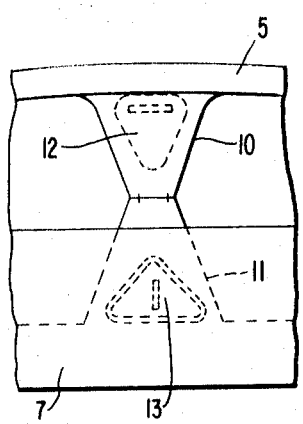
FIG. 2 is a somewhat schematic partial side elevational view of one embodiment of a center support column in accordance with the present invention, in which the hollow center support column is constructed trapezoidally shaped within the upper and lower area and is detachably joined in the center in a separating plane.

In FIG. 2 the center column 3 consists of two trapezoidally shaped hollow sections 10 and 11 whereby within the upper section 10 there is provided in the interior an arrangement 12 with a tubular or overhead lamp for the interior lighting system. The lower center support column section 11, in contrast thereto, contains a hollow space which is utilized for storing a warning sign 13. The upper and lower hollow space sections 10 and 11 are detachably connected with each other in the separating plane 14.

Figure 3:
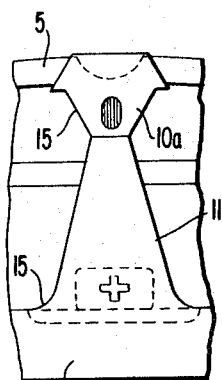
FIG. 3 is a somewhat schematic partial side elevational view, similar to FIG. 2, of a modified embodiment in which the upper trapezoidal section of the center support column is kept relatively small.

In FIG. 3 the upper center support column section 10a is constructed considerably smaller. It serves in this embodiment, for example, for the accommodation of a microphone of a speaker or telephone installation. A first-aid kit is accommodated in the lower section 11a. This type of construction offers the advantage that the visibility of the vehicle passengers is only very slightly impaired by the relatively wide construction of the center column, yet an enormous bearing capacity of the hollow center column is achieved nonetheless. As also in the embodiment of FIG. 2, the corners 15 of the center column are rounded off so that, for example, in case of a rolling over during an accident, no peak stresses can occur at these places which might lead to a bending, buckling or breaking off of the center column.

Figure 4:
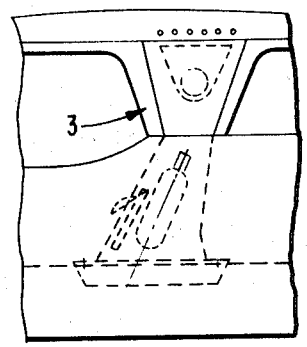
FIG. 4 is a somewhat schematic side elevational view, similar to FIGS. 2 and 3, of still another modified embodiment of a center support column in accordance with the present invention with an upwardly inclined type of construction.

In FIG. 4 of the center column 3 is arranged extending at an inclination from the top toward the bottom and serves in its lower section, for example, for the accommodation of a fire extinguisher apparatus. Additionally, however, space is provided also for the storing of a pocket umbrella or the like. The upper section is equipped with a loudspeaker.

It can be readily recognized in FIG. 5 that the center column 3 of FIG. 1 represents a hollow profile or section 16 extraordinarily stable against buckling. A safety belt anchoring means with a conventional reel 17 is provided on the inside of the hollow profile 16 which assures that the nonused safety belt is automatically wound up and is arranged on the inside of the center support column 3. The hook 18 of the safety belt is thereby retained in an abutment within a corresponding aperture of the hollow profile 16 and is covered off against the interior of the vehicle essentially by the padding layer 19 that makes impossible an injuring of the passengers in case of an impact.

In the embodiment according to FIG. 3 the passenger space 1 of a motor vehicle 2 is reinforced by center support columns corresponding to FIG. 1, as already mentioned, consisting of two parts 10a and 11a. The upper part 10a constructed as hollow cross-sectional profile is thereby constructed unitary on in one piece with a crossbearer 20 dimensioned so as to be particularly form-rigid which is also constructed as hollow profile and is arranged within the area of the roof. This crossbearer 20 is simultaneously connected with the longitudinal roof beams 5. Within the area of the plane 14 the upper hollow cross-sectional profile 10a together with the crossbearer 20 is detachably seated at the lower part 11a of the center support column which, within its lower area, is connected to the lower longitudinal bearers 7 of the motor vehicle body. Both the upper center column part 10a as also the lower center column part 11a are enlarged, as viewed in side view, from the narrowest cross section (plane 14) disposed within the area of the side windows 21 in the upward and downward direction and may, for example like the part 11a, pass over into the longitudinal bearers preferably with rounded-off corners 15.

Figure 3A:
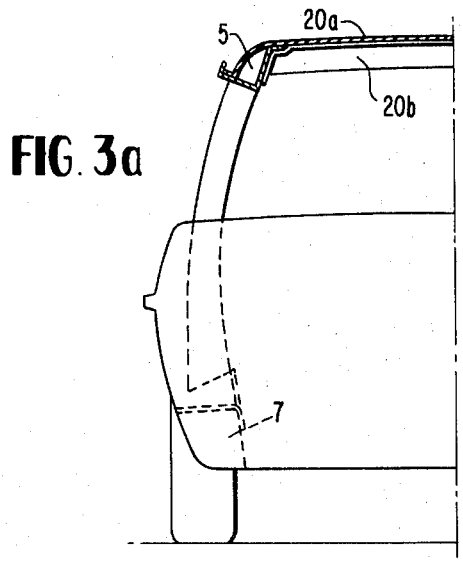
FIGS. 3a–3f are somewhat schematic partial transverse cross-sectional views through six further modified embodiments of a center support column in accordance with the present invention provided with a further reinforcement of the passenger space.
Figure 3B:
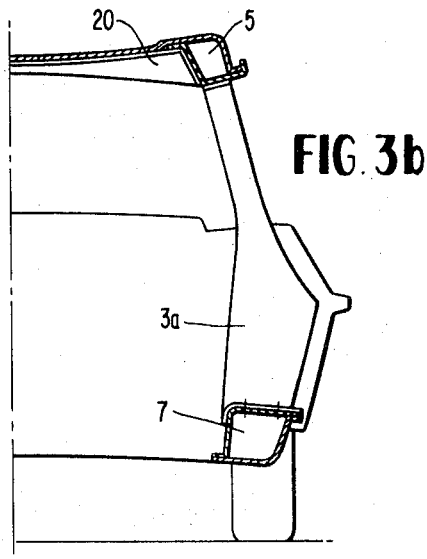

It can be seen from FIG. 3a that the center support column 3 is secured at its lower end on the longitudinal bearer 7 and is connected at its upper end with the longitudinal bearer 5. The crossbearer 20 is formed in this embodiment by the roof 20a itself and by a flanged member or girder 20b constructed as hollow profile and attached underneath the roof. In FIG. 3b is illustrated an embodiment in which the center support column 3 also adjoins at the top the roof longitudinal bearer 5 which, however, passes over into a concave roof surface. Also in this embodiment a crossbearer 20 is created by the cooperation of the roof surface and of a transversely extending hollow profile. Within the lower area, the center support column 3 is constructed into the section 3a which is kept very wide according to FIG. 3 in the longitudinal direction of the vehicle and also, as visible in FIG. 3b, in the transverse direction of the vehicle and therefore offers a large amount of space for the accommodation of accessories. The center support column 3 is detachably connected with the lower longitudinal bearer 7.

Figure 3C:
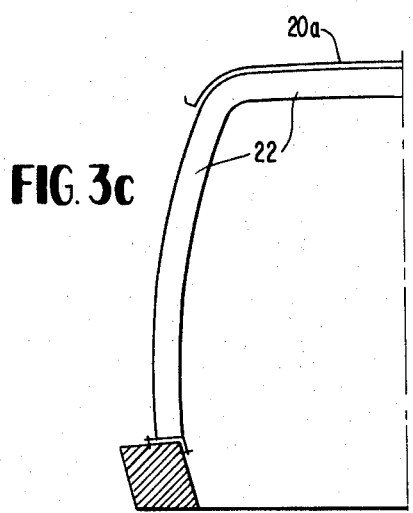

In FIG. 3c a type of construction is shown in which the center crossbearer and the center support column are combined into a unitary or one-piece, arcuately shaped bearer profile 22 that is secured on the lower longitudinal bearers 7 and extends over the passenger space within the area of its center. This type of construction offers therefore an extraordinary stable construction of the passenger space because the profile 22 acts as a rollover bar.

Figure 3D:
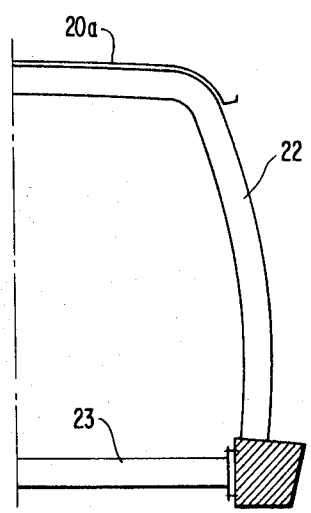

The reinforcement of the passenger space can also be further increased according to FIG. 3d in that in addition to the rollover bar 22, which is disposed underneath the roof surface 20a, a crossbearer 23 is arranged at the vehicle floor which establishes a connection of the longitudinal bearers 7.

Figure 3E:
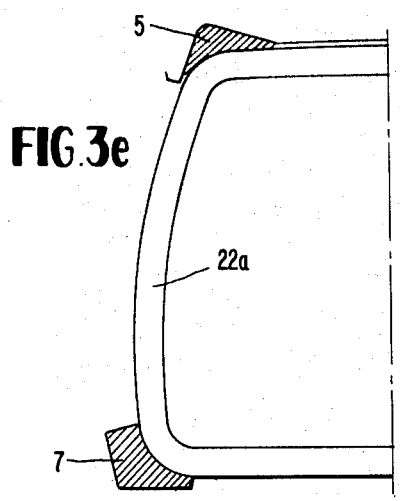

In the construction according to FIG. 3e in which a continuous or uninterrupted support ring 22a is provided, on which are mounted the upper and lower longitudinal bearers 5 and 7, there can be achieved a further reinforcement of the center of the passenger space. By reason of the closed profile, a deformation of the passenger space at this place is nearly impossible.

Figure 3F:
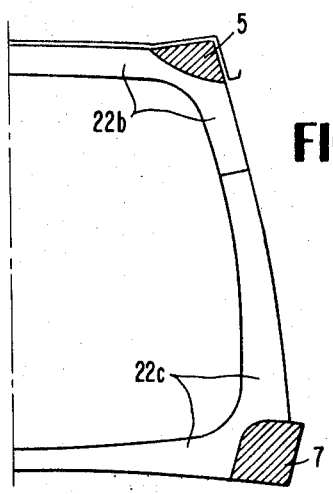

For manufacturing reasons it may be advantageous to subdivide the closed support ring 22a according to FIG. 3f into the component parts 22b and 22c which are detachably connected with each other in the plane 14. In order to avoid the projecting of the longitudinal bearers 5 and 7, provision may also be made in this embodiment that the profiles 22b and 22c are provided with corresponding recesses or apertures for the accommodation of the longitudinal bearers 5 and 7.

A considerable reinforcement of the passenger space is achieved by the construction according to FIGS. 3a and 3f. Since the profiles used in each case are hollow profiles and can be constructed relatively wide in the longitudinal direction of the vehicle, the accommodation and storing of accessory parts on the inside of the hollow spaces is possible in all embodiments of the instant application without having to keep free for this purpose additional space within the motor vehicle.

Thus, a particularly advantageous securing possibility for safety belts is provided by the present invention. Also, the space utilization of the entire vehicle can be increased so that, for example, also for smaller types of motor vehicles in which up to now one generally had to abandon the arrangement of wide, load-bearing center columns, a possibility for the increase of internal safety is opened up.

While we have shown and described several embodiments of the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A center support column for motor vehicle roof, wherein the vehicle has upper and lower longitudinal bearer means connected to the center column, characterized by hollow centrally disposed cross-sectional profile means being of relatively large dimension in the longitudinal direction of the vehicle at least within the connecting area of the upper and lower longitudinal bearer means, said profiled means forming therewithin at least one hollow space section constituting an upwardly extending luggage and/or accessory compartment, the interior configuration of said section being such as to accommodate removable luggage and accessories, and wherein the at least one section has means for being accessible from the inside of the vehicle and/or from the outside of the vehicle.

2. A center support column according to claim 1, wherein several hollow space sections are provided within said profile means.

3. A center support column according to claim 2, wherein at least one of said space sections is accessible from the inside of the vehicle.

4. A center support column according to claim 3, wherein at least some of the hollow space sections are accessible from the outside of the vehicle.

5. A center support column according to claim 1, wherein the cross-sectional profile means is so constructed at the connecting places that the center column is connected with rounded-off corners to the longitudinal bearer means.

6. A center support column according to claim 1, wherein the roof includes a crossbearer means dimensioned so as to be particularly form-rigid and at least the hollow cross-sectional profile means disposed within the area of the upper longitudinal bearer means adjoins the crossbearer means.

7. A center support column according to claim 6, wherein the crossbearer means is constructed as a rollover bar.

8. A center support column according to claim 7, wherein said crossbearer means is formed by a flanged member and the roof sheet metal panel.

9. A center support column according to claim 8, wherein the crossbearer means is detachably arranged inside and below the roof bearer means.

10. A center support column according to claim 6, wherein the crossbearer means is constructed at its ends directly as the upper hollow cross-sectional profile means.

11. A center support column according to claim 10, wherein the ends of the crossbearer means are connected by way of readily detachable means with the lower hollow cross-sectional profile means of the center support column.

12. A center support column according to claim 11, wherein the cross-sectional profile means become wider from the narrowest cross section disposed within the area of the side windows in the upward and downward direction.

13. A center support column according to claim 12, wherein the cross-sectional profile means is so constructed at the connecting places that the center column is connected with rounded-off corners to the longitudinal bearer means.

14. A center support column according to claim 6, wherein the cross-sectional profile means become wider from the narrowest cross section disposed within the area of the side windows in the upward and downward direction.

15. A center support column according to claim 7, wherein the rollover bar is constructed as unitary hollow profile means which extends over the passenger space in an arcuate shape.

16. A center support column according to claim 15, wherein the lower ends of the rollover bar are extended from the lower longitudinal bearer means by way of a floor crossbearer means.

17. A center support column according to claim 16, wherein the rollover bar together with the lower crossbearer means is constructed as a closed support ring profile which is arranged in the center of the passenger space.

18. A center support column according to claim 17, wherein the closed support ring consists of two parts which are detachably connected with each other within a plane disposed within the area of the side windows.

19. A center support column according to claim 18, wherein a hollow space open toward the inside is provided within the upper area of the center support column which is equipped with means for fastening and storing safety belts.

20. A center support column according to claim 19, wherein said last-mentioned means includes roller means for winding-up the safety belts.

21. A center support column according to claim 20, wherein the side of the hollow space facing the passenger space is provided with elastic padding means which includes only an aperture for taking out the safety belt.

22. A center support column according to claim 21, wherein within the lower area of the center support column a hollow space open in a downward direction is provided for the accommodation of an automatically extensible vehicle lifting jack.

23. A center support column according to claim 21, wherein within the lower area of the center support column, a hollow space is provided for the accommodation of accessories.

24. A center support column according to claim 21, wherein the center support column, as viewed in side view, has the shape of two trapezoids which abut against one another with the small sides thereof.

25. A center support column according to claim 24, wherein the lower area is detachably connected at the upper area of the center support column.

26. A center support column according to claim 9, wherein the cross-sectional profile means is so constructed at the connecting places that the center column is connected with rounded-off corners to the longitudinal bearer means.

27. A center support column according to claim 1, wherein the cross-sectional profile means become wider from the narrowest cross section disposed within the area of the side windows in the upward and downward direction.

28. A center support column according to claim 1, wherein a hollow space open toward the inside is provided within the upper area of the center support which is equipped with means for fastening and storing safety belts.

29. A center support column according to claim 28, wherein said last-mentioned means includes roller means for winding up the safety belts.

30. A center support column according to claim 29, wherein the side of the hollow space facing the passenger space is provided with elastic padding means which includes only an aperture for taking out the safety belt.

31. A center support column according to claim 1, wherein within the lower area of the center support column, a hollow space open in a downward direction is provided for the accommodation of an automatically extensible vehicle lifting jack.

32. A center support column according to claim 1, wherein within the lower area of the center support column, a hollow space is provided for the accommodation of accessories.

33. A center support column according to claim 1, wherein the center support column, as viewed in side view, has the shape of two trapezoids which abut against one another with the small sides thereof.

34. A center support column according to claim 33, wherein the lower area is detachably connected at the upper area of the center support column within a separating plane.

35. A center support column according to claim 1, wherein the lower area is detachably connected at the upper area of the center support column within a separating plane.

36. A center support column according to claim 6, wherein said crossbearer means is formed by a flanged member and the roof sheet metal panel.

37. A center support column according to claim 36, wherein said crossbearer means is arranged inside the upper longitudinal bearer member.

38. A center support column according to claim 37, wherein said profile means is secured at its lower end on the lower vehicle longitudinal bearer and at its upper end on the upper longitudinal bearer.

* * * * *